June 30, 1970  O. J. KOHLBECK ET AL  3,517,881
TEMPERATURE CONTROLLER
Filed Jan. 19, 1968
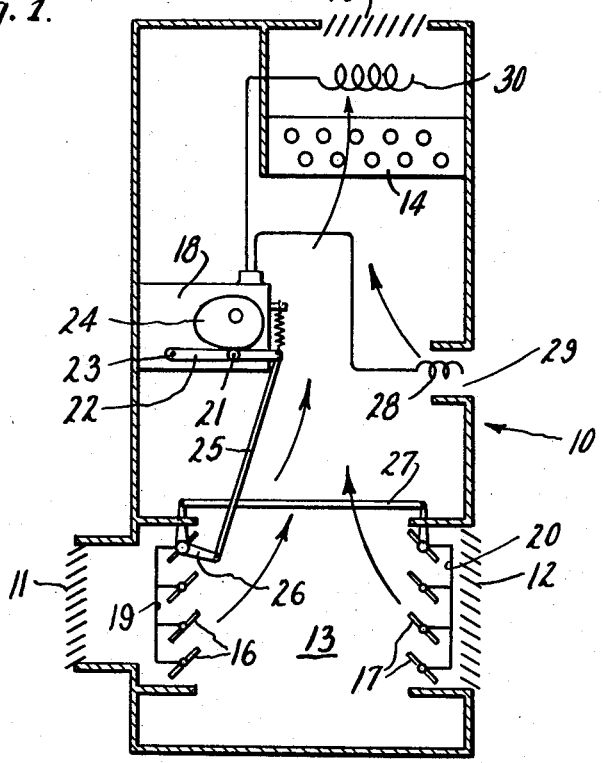
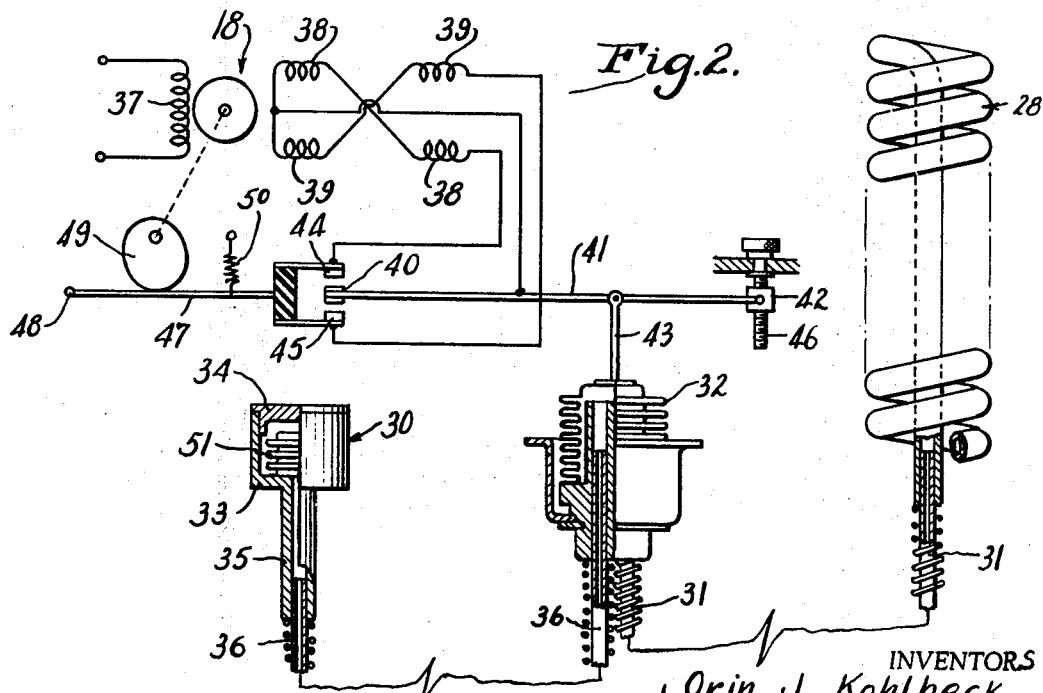
INVENTORS
Orin J. Kohlbeck
and Russell P. Sweger
BY Wolfe, Hubbard, Voit & Osann
ATTORNEYS United States Patent Office  3,517,881
Patented June 30, 1970

3,517,881
TEMPERATURE CONTROLLER
Orin J. Kohlbeck and Russell P. Sweger, Rockford, Ill., assignors to Barber-Colman Company, Rockford, Ill., a corporation of Illinois
Filed Jan. 19, 1968, Ser. No. 699,236
Int. Cl. G05d 23/19
U.S. Cl. 236—13                                1 Claim

ABSTRACT OF THE DISCLOSURE

A unit apparatus for conditioning air, either by heating or cooling, when the air to be conditioned is a combination of outside air and recirculated room air. The inlets for the outside air and the room air are controlled by individual dampers which, in turn, are under the joint control of two temperature sensors, one responsive to room air temperature and the other responsive to the temperature of the conditioned air leaving the unit. A material which solidifies at a predetermined temperature and which has a substantial change in dimension when it changes between liquid and solid states is placed in the outlet of the unit and is effective to override the sensors and close the outside air damper when the material solidifies.

BACKGROUND OF THE INVENTION

This invention relates to an apparatus for controlling temperature and has particular use in an apparatus for conditioning air, the conditioning being either heating or cooling. In units of this type, the air be conditioned customarily is a combination of outside air and recirculated room air. The respective inlets for both are controlled by individual dampers and the proportion of each is under the combined control of two sensors which control the positions of the dampers. One of the sensors responds to the temperature of the room air and the other to the temperature of the air leaving the unit and entering the room.

SUMMARY OF THE INVENTION

In some instances, it is desirable to override the control of a temperature responsive sensor rather suddenly and the main object of the invention is to provide such an overriding control. For example, with conditioning units of the foregoing type, persons in the room experience discomfort when the air leaving the unit falls below a certain level. Usually, this temperature is in the neighborhood of 55 degrees Fahrenheit. Accordingly, the present invention aims to provide a novel means which normally is ineffective but, when the air leaving the unit falls below the comfortable level, is effective to override the sensors and close the outside air damper so that only recirculated room air flows through the unit.

BRIEF DESCRIPTION OF THE DRAWINGS

FIG. 1 is a schematic view of a conditioning unit incorporating the novel control of the present invention.
FIG. 2 is a schematic view of the control.

DETAILED DESCRIPTION OF THE PREFERRED EMBODIMENTS

As shown in the drawings for purposes of illustration, the invention is shown embodied in an apparatus for conditioning the air of an enclosure such as a room and, more particularly, in a unit type of conditioner. The conditioner unit 10 may heat the air, cool the air, or both, this being well-known in the art. Air to be conditioned is a combination of outside air entering the unit through an inlet 11 and recirculated room air which enters through a second inlet 12. The two sources of air are mixed in a chamber 13 and flow across a conditioning device 14 which may be either a heater or a cooler. From the device 14, the air leaves the unit 10 through an outlet 15 and flows into the room.

Means is provided to proportion the amounts of outside air and room air which are mixed in the chamber 13. Herein, this means comprises a set of damper vanes 16 across the outside air inlet 11 and a similar set of damper vanes 17 across the room air inlet 12 while a reversible motor 18 moves both sets of vanes in unison but in opposite directions in response to the temperature of the room air and the temperature of the air leaving the unit 10. Thus, the vanes 16 are connected by a conventional linkage 19 to move together while a similar linkage 20 causes the vanes 17 to move together. A follower 21 on a lever 22, which is pivotally mounted at one end as indicated at 23, coacts with a cam 24 driven by the motor 18 so that the lever moves up and down as determined by the cam. The free end of the lever 22 is connected by links 25 and 26 to open and close the vanes 16 in response to swinging of the lever. A link 27 connects the link 26 with the linkage 20 so that the vanes 17 are also turned by the motor 18 through the cam 24. The arrangement is such that, when the motor turns in one direction, the vanes 16 open while the vanes 17 close and the opposite action occurs when the motor is reversed.

In order to control the vanes 16 and 17 in response to the temperature of both the room air and the air leaving the unit 10, a temperature sensor 28 is disposed in a room air sampling chamber 29 and a second temperature sensor 30 is placed in the outlet 15, the two sensors operating a controller 32 in the form of a resilient bellows. As shown in FIG. 2, the sensor 28 is a housing in the form of a coiled tube closed at one end and, through the medium of a flexible conduit 31, communicates at the other end with the interior of the resilient bellows 32. The tube 28, the conduit 31 and the bellows 32 are filled with a liquid which expands with an increase in temperature and contracts with a decrease. Thus, the bellows expands as the temperature of the room air rises and collapses as that temperature drops.

The outlet temperature sensor 30 in this instance is a housing formed by a cup 33 sealed closed by a cap 34 and formed with a downwardly projecting pipe portion 35 communicating with the interior of the cup. A flexible conduit 36 connects the pipe portion with the interior of the bellows 32 and the cup 33, the pipe portion 35 and the conduit 36 contain the same liquid as do the coil 28 and the conduit 31. As a result, an increase in the temperature of the outlet air tends to expand the bellows 32 while a decrease tends to collapse the bellows. The arrangement is such that the room air sensor 28 exerts a greater control over the bellows than does the outlet air sensor 30, the particular ratio of control being determined by the amount of fluid in the coil 28 as compared to the amount in the cup 33. In practice, the control of the sensor 28 is eight to twenty times that of the sensor 30 although a range of twelve to sixteen is more customary.

Expansion of the bellows 32 causes the motor 18 to operate in a direction to open the outside air vanes 16 and close the room air vanes 17 while collapsing of the bellows reverses the motor and produces the opposite action of the vanes. For this purpose, the motor 18 is of the reversible single phase induction type with a field winding 37 and forward and reverse shading windings 38 and 39. A contact 40 is carried on one end of a lever 41 fulcrumed at 42 and a rod 43 supported on the bellows 32 engages the lever 41 intermediate its ends so that the contact moves up and down as the bellows expands and contracts. The contact 40 is disposed between opposed contacts 44 and 45 and the circuit of the forward shading windings 38 is closed when the contact 40 engages the contact 44 while engagement of the contact 45 by the contact 40 completes the circuit of the reverse shading windings 39. To adjust the set point of the system, the fulcrum 42 is movable and, for this purpose, the fulcrum is a nut threaded on a screw 46 which is held against axial movement.

The contacts 44 and 45 also are mounted on a lever 47 which is fulcrumed at 48 and is biased against a cam 49 by a spring 50. The cam is driven by the motor 18 and operates to rebalance the control, that is, it moves either the contact 44 or the contact 45 out of engagement with the contact 40 when the motor has positioned the vanes 16 and 17 to correspond to the condition of the bellows.

In some instances, it is desirable to override the temperature sensors quite suddenly. For example, in air conditioning apparatus, it has been found that air at about 55 degrees Fahrenheit and below flowing over a person causes discomfort. Accordingly, the present invention contemplates the provision of novel means for immediately moving the outside air vanes 16 toward the closed position as soon as the air leaving the outlet 15 is lowered to a preselected temperature such as 55 degrees Fahrenheit. This means comprises a liquid material which solidifies at about the preselected temperature and which has a substantial change in volume when it changes between a liquid and a solid. The material is located at the outlet 15 and overrides the controlling effect of the temperature responsive liquid in the coil 28 and the cup 33 so that the motor 18 closes the outside air damper vanes. In the present instance, the material used contracts when it solidifies and is a wax disposed within the cup 33. A suitable wax for this purpose is pentadecane. This wax melts at approximately 50 degrees Fahrenheit. When the wax solidifies in the cup 33, it causes an overall reduction in the combined volume of the wax and liquid in the system comprising the cup, the coil 28, the bellows 32 and the conduits 31 and 36. This reduction in volume is sufficient to collapse the bellows and cause the motor 18 to drive the vanes 16 to the fully closed position regardless of the level of the room temperature. While the wax may be mixed directly with the liquid in the cup 33, it is preferred to place the wax in an expansible chamber disposed within the cup. Thus, in the preferred embodiment illustrated in the drawings, the wax is in an expansible bellows 51 floating in the cup.

It will be observed that, normally, the air being conditioned is a mixture of recirculated room air and outside air. The proportion of each is governed by the temperature of the room air as detected by the sensor 28 and the temperature of the air leaving the unit 10 as detected by the sensor 30, the two sensors combining to control the positions of the outside air and room air vanes 16 and 17. When the temperature of the air leaving the outlet 15 of the unit falls below a preselected level, however, the wax in the bellows 51 solidifies and contracts. This collapses the bellows 51 and overrides the control of the fluid in the sensors 28 and 30 so that the outside air vanes 16 are driven to the fully closed position.

We claim as our invention:

1. In a unit for conditioning room air, the combination of, a housing having a first inlet for admitting outside air, a second inlet for admitting room air and an outlet, a first damper controlling said first inlet, a second damper controlling said second inlet, control mechanism for operating said dampers, a first temperature responsive means including a housing containing a fluid which expands and contracts in response to changes in the temperature of the air flowing through said outlet, a second temperature responsive means including a housing containing a fluid which expands and contracts in response to changes in the temperature of the room air, means for operating said control mechanism in response to dimensional changes of the fluid in both of said chambers whereby the positions of both of said dampers are correlated to both of said temperatures, and a material disposed in the housing of said first temperature responsive means and having a predetermined melting point, said material having a sudden and substantial dimensional change as it solidifies to override the control of the fluid and cause said dampers to close said first inlet.

References Cited

UNITED STATES PATENTS

| 1,704,141 | 3/1929 | Muffly. | |
| 1,736,984 | 11/1929 | Sheats. | |
| 2,221,347 | 11/1940 | Giesler | 236—98 X |
| 2,622,923 | 12/1952 | Cobb | 73—358 |
| 2,884,198 | 4/1959 | Woods | 236—34 |
| 3,252,227 | 5/1966 | Fleer | 34—45 |

EDWARD J. MICHAEL, Primary Examiner

U.S. Cl. X.R.

236—37, 38, 74; 73—368.2